United States Patent Office 3,629,472
Patented Dec. 21, 1971

3,629,472
BACTERICIDAL COMPOSITIONS CONTAINING SUBSTITUTED NITROPYRIDINES
Patrick R. Driscoll, Fords, N.J., assignor to Mobil Oil Corporation
No Drawing. Filed July 10, 1968, Ser. No. 743,608
Int. Cl. A01n 9/22
U.S. Cl. 424—263
4 Claims

ABSTRACT OF THE DISCLOSURE

Compositions of substituted 2-halo-5-nitropyridines on a carrier therefor are effective in combatting plant bacteria.

BACKGROUND OF THE INVENTION

Field of the invention

This invention relates to new compositions having utility as bactericides. It is particularly concerned with bactericidal compositions containing substituted halonitropyridines.

DESCRIPTION OF THE PRIOR ART

In spite of the large amount of work that has been done on the protection of plants from attack by harmful bacteria, there are still relatively few good bactericides available. Thus, materials applied to destroy bacteria are sometimes likely to injure the host plant. Many materials have been proposed for other uses, such as herbicides or fungicides, but they are unsuitable as bactericides. Insofar as is now known, the substituted nitropyridines described herein have not been proposed for combatting bacteria.

SUMMARY OF THE INVENTION

This invention provides agricultural bactericidal compositions comprising at least one compound having the formula:

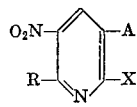

wherein X is halogen, A is nitro, cyano,

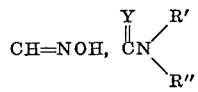

or SCN, and R, R', and R" are hydrogen or alkyl ($C_1$–$C_4$) and Y is S or O and a carrier therefor. It also provides a method for combatting bacteria which comprises contacting bacteria with at least one of the aforedefined compounds.

DESCRIPTION OF SPECIFIC EMBODIMENTS

The bactericidal nitropyridine derivatives contemplated herein are known and can be prepared by methods well known in the art. Typical methods are illustrated in the following examples.

EXAMPLE 1

2-chloro-3,5-dinitropyridine 2-hydroxy-3,5-dinitropyridine (10.0 g., 0.054 mole), phosphorus oxychloride (32 ml.) and dimethyl formamide (3 ml.) were heated to 115° C. and held at that temperature for 20 minutes. The mixture was cooled and poured over 100 g. of ice with good stirring. The pale yellow solid was filtered, weighing 10.7 g. (yield 97.3%) M.P. 61–64° C. Recrystallization from benzene gave a white solid M.P. 62.5–64° C.

EXAMPLE 2

2-bromo-3,5-dinitropyridine

The same procedure as in Example 1, using $POBr_3$ in place of $POCl_3$. Yellow solid obtained weighing 12.6 g. (yield 90.6%) M.P. 73–75° C. Recrystallization from benzene gave a solid M.P. 74–75° C.

EXAMPLE 3

2-chloro-3-cyano-5-nitro-6-methylpyridine 3-cyano-6-methyl-5-nitro-2-pyridone (10.2 g., 0.057 mole), phosphorus pentachloride (14.3 g., 0.065 mole), and phosphorus oxychloride (50 ml.) were heated to 115° C. and held at that temperature for 30 minutes. The $POCl_3$ was removed by distillation under reduced pressure and the residue treated with 50 percent ethanol-water (20 ml.). The brown solid residue was filtered and, weighed 9.1 g. (yield 80.5%). Recrystallization from methanol gave a tan solid, M.P. 97–98° C.

Typical of the nitropyridine derivatives are:

2-chloro-3,5-dinitropyridine;
2-bromo-3,5-dinitropyridine;
2-iodo-3,5-dinitropyridine;
2-chloro-3,5-dinitro-6-methylpyridine;
2-bromo-3,5-dinitro-6-butylpyridine;
2-bromo-3-cyano-5-nitro-6-ethylpyridine;
2-chloro-3-cyano-5-nitro-6-methylpyridine;
2-fluoro-3,5-dinitropyridine;
2-chloro-3-cyano-5-nitropyridine;
2-bromo-3-cyano-5-nitro-6-propylpyridine;
2-chloro-3-cyano-5-nitro-6-butylpyridine;
2-chloro-3-formaldoximino-5-nitro-6-methylpyridine;
2-chloro-3-carboxamido-5-nitro-6-methylpyridine;
2-chloro-3-thiocyanato-5-nitro-6-methylpyridine; and
2-chloro-3-thiocarboxamido-5-nitro-6-methylpyridine.

These nitropyridine compounds have been found to be effective agricultural bactericides. The nitropyridine derivatives contemplated herein are applied as the toxic components in bactericidal compositions of at least one derivative and a carrier. In order to achieve a broader spectrum of control, it is within the contemplation of this invention to include two or more nitropyridine derivatives in the bactericidal composition.

The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the bactericidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fuller's earth, gypsum, flours derived from cotton seeds and nut shells, and various natural and synthetic clays having a pH not exceeding about 9.5.

The amount of the contemplated nitropyridine derivatives used in the bactericidal compositions will vary rathter widely. It depends to some extent upon the type of composition in which the material is being used, the nature of the condition to be controlled, and the method of application. In the ultimate bactericidal composition, as applied in the field, bactericidal concentrations as low as 0.0001 weight percent of the total composition can be used. In general, compositions, as applied, containing about 0.005–0.01 weight percent (50–100 p.p.m.) bactericide in either liquid or solid carrier, give good results. In some cases, however, stronger dosages up to about 1 weight percent may be required.

In practice, bactericidal compositions are usually prepared in the form of concentrates, which are diluted in the field to the concentration desired for application. For example, the concentrate can be a wettable powder containing large amounts of bactericide, a carrier (e.g., attapulgite or other clay), and wetting and dispersing agents. Such powders can be diluted prior to application by dispersing it in water to obtain a sprayable suspension containing the concentration of bactericide desired for application. Other concentrates can be solutions that can be later diluted, e.g., with kerosene. Thus, it is within the contemplation of this invention to provide bactericidal compositions containing up to about 80 percent, by weight of the composition, of bactericide. Accordingly, depending upon whether it is ready for application or it is in concentrated form, the contemplated bactericidal compositions contain between about 0.0001 percent and about 80 percent, by weight of the composition of at least one bactericidal nitropyridine derivative and a carrier, liquid or solid, as defined hereinbefore.

The bactericides are tested for effectiveness against plant bacteria by the following procedure:

CONTACT SCREENING METHODS

Penicillin disc test (primary).—Method of culturing the test organism

*Xanthomonas vesicatoria,* the causal organism of bacterial leaf spot of pepper, is cultured on nutrient agar in 20 x 150 mm. test tubes. The medium is prepared by dissolving 23 grams of nutrient agar in 1000 ml. of cold distilled water, heating to boiling to completely dissolve the agar, and sterilizing in the autoclave for 15 minutes at 15 pounds pressure and 121° C. Ten ml. of the medium is poured in each test tube, allowed to solidify and then streaked with the bacterium from a pure culture. Cultures are optimum for use in tests after seven days.

Method of treatment

A seven-day old culture of *X. vesicatoria* is washed from a test tube with sterile water and added to 500 ml. of nutrient agar when the medium reaches a temperature of 50° C. Forty ml. of inoculated medium is added immediately to each 90 mm. petri plate and allowed to solidify. A 100 p.p.m. solution of the compound is prepared by dissolving the compound in a suitable solvent and diluting with water to a 100 ml. volume. With sterile forceps, two sterile penicillin assay disc (12 mm. diameter) are dipped into each solution, tapped gently to remove excess solution and planted on top of the medium surface. Each disc is pressed gently on the medium to seat it firmly. Plates are covered and incubated at 26° C. for seven days.

Method for recording results

After seven days, ratings are made by measuring the diameter of the zone of inhibition surrounding the disc according to the following key:

Key to penicillin disc test

| Rating: | Diameter of zone of growth inhibition, mm. |
|---|---|
| 1 | 0 |
| 2 | 0–6 |
| 3 | 9 |
| 4 | 12 |
| 5 | 15 |
| 6 | 18 |
| 7 | 21 |
| 8 | 24 |
| 9 | 27 |
| 10 | 30 or more [1] |

[1] Streptomycin sulfate gives this rating after seven days at 100 p.p.m.

The compounds of Examples 1, 2, and 3 were subjected to the aforedescribed test. Test results were:

| | Example | | |
|---|---|---|---|
| Concn., p.p.m. | 1 | 2 | 3 |
| 100 | 8 | 8 | 10 |
| 50 | | 6 | 6 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for combatting agricultural bacteria that comprises contacting said bacteria with a bactericidal amount of a compound having the formula:

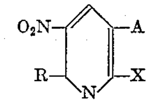

wherein X is halogen, A is nitro, cyano, $\overset{O}{\overset{\|}{C}}NH_2$, $\overset{S}{\overset{\|}{C}}NH_2$, CH=NOH, or SCN and R is hydrogen or alkyl ($C_1$–$C_4$).

2. The method of claim 1, wherein said compound is 2-chloro-3,5-dinitropyridine.

3. The method of claim 1, wherein said compound is 2-bromo-3,5-dinitropyridine.

4. The method of claim 1, wherein said compound is 2-chloro-3-cyano-5-nitro-6-methylpyridine.

References Cited

UNITED STATES PATENTS 3,325,503 6/1967 Bimber ---------- 424—263 X

OTHER REFERENCES

Chemical Abstracts (I), vol. 50, 1956; 12045i.
Chemical Abstracts (II), vol. 55, 1961; 10434g.
Chemical Abstracts (III), vol. 46, 1952; 8187a.

ALBERT T. MEYERS, Primary Examiner
L. SCHENKMAN, Assistant Examiner